(12) United States Patent
Kimura

(10) Patent No.: US 9,926,838 B2
(45) Date of Patent: Mar. 27, 2018

(54) CONTROL SYSTEM FOR SPARK-IGNITION INTERNAL COMBUSTION ENGINE

(71) Applicant: TOYOTA JIDOSHA KABUSHIKI KAISHA, Toyota-shi, Aichi-ken (JP)

(72) Inventor: Koshiro Kimura, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/104,777

(22) PCT Filed: Dec. 9, 2014

(86) PCT No.: PCT/IB2014/002703
§ 371 (c)(1),
(2) Date: Jun. 15, 2016

(87) PCT Pub. No.: WO2015/092507
PCT Pub. Date: Jun. 25, 2015

(65) Prior Publication Data
US 2017/0002724 A1    Jan. 5, 2017

(30) Foreign Application Priority Data

Dec. 17, 2013    (JP) ................................ 2013-260431

(51) Int. Cl.
*F02B 31/00*    (2006.01)
*F02B 31/06*    (2006.01)
(Continued)

(52) U.S. Cl.
CPC ............ *F02B 31/06* (2013.01); *F02B 17/005* (2013.01); *F02D 41/3005* (2013.01);
(Continued)

(58) Field of Classification Search
CPC .. F02B 31/06; F02B 17/005; F02B 2023/106; F02B 2275/48; F02P 15/006;
(Continued)

(56) References Cited

U.S. PATENT DOCUMENTS 6,672,277 B2 *    1/2004   Yasuoka ............... F02B 17/005
                                                              123/295
2002/0078919 A1    6/2002   Yasuoka et al.
(Continued)

FOREIGN PATENT DOCUMENTS

EP              1898064 A1      3/2008
JP         2008-267323 A      11/2008
(Continued)

*Primary Examiner* — Hai Huynh
(74) *Attorney, Agent, or Firm* — Andrews Kurth Kenyon LLP

(57) ABSTRACT

A control system for a spark-ignition internal combustion engine configured to produce tumble flow in a cylinder is provided. The spark-ignition internal combustion engine includes an ignition plug configured to ignite an air-fuel mixture in the cylinder. The control system includes a tumble flow rate controller configured to change a position of a vortex center of the tumble flow as viewed in a direction of a center axis of the cylinder, so as to control a flow rate of the tumble flow around the ignition plug at the ignition timing of the ignition plug.

9 Claims, 13 Drawing Sheets

(51) Int. Cl.
  *F02D 41/38*    (2006.01)
  *F02D 41/40*    (2006.01)
  *F02B 17/00*    (2006.01)
  *F02D 41/30*    (2006.01)
  *F02P 15/00*    (2006.01)
  *F02D 41/00*    (2006.01)

(52) U.S. Cl.
  CPC ......... *F02D 41/3836* (2013.01); *F02D 41/40* (2013.01); *F02P 15/006* (2013.01); *F02D 2041/0015* (2013.01); *F02D 2041/389* (2013.01); *Y02T 10/44* (2013.01)

(58) Field of Classification Search
  CPC .. F02D 41/3005; F02D 41/3836; F02D 41/40; F02D 2041/0015; F02D 2041/389; Y02T 10/44
  USPC .................................................. 123/298, 301
  See application file for complete search history.

(56) References Cited

U.S. PATENT DOCUMENTS

2014/0069393 A1* 3/2014 Yarino ................. F02B 23/104
                                                  123/478
2016/0298586 A1* 10/2016 Kimura ................ F02M 59/22

FOREIGN PATENT DOCUMENTS

| JP | 2008-303798 A | 12/2008 |
| JP | 2011-196208 A | 10/2011 |
| JP | 2012-021501 A | 2/2012 |
| WO | 2008/012626 A2 | 1/2008 |
| WO | 2008/012656 A1 | 1/2008 |
| WO | 2008/015536 A1 | 2/2008 |

\* cited by examiner

FIG.6

WHEN SA=40BTDC

| TR | ΔT | IT |
|---|---|---|
| 1 | 180° | 220BTDC |
| 1.5 | 120° | 160BTDC |
| 2 | 90° or270° | 130or310BTDC |

MINUTE INJECTION TIME

WHEN SA=40BTDC

| TR | ΔT | IT |
|---|---|---|
| 1 | 90° | 130 |
| 1.5 | 60° or300° | 100or340BTDC |
| 2 | 45° or225° | 85or265BTDC |

CONTROL SYSTEM FOR SPARK-IGNITION INTERNAL COMBUSTION ENGINE

CROSS-REFERENCE TO RELATED APPLICATIONS

This is a national phase application based on the PCT International Patent Application No. PCT/IB2014/002703 filed Dec. 9, 2014, claiming priority to Japanese Patent Application No. 2013-260431 filed Dec. 17, 2013, the entire contents of both of which are incorporated herein by reference.

BACKGROUND OF THE INVENTION

1. Field of the Invention

The invention relates to a control system for a spark-ignition internal combustion engine.

2. Description of Related Art

A control system for an internal combustion engine including a tumble flow control valve that produces tumble flow in each cylinder is disclosed in, for example, Japanese Patent Application Publication No. 2012-021501 (JP 2012-021501 A). In this control system, an estimated tumble ratio is calculated, based on a detection value of a first air flow meter provided upstream of a throttle valve, and a detection value of a second air flow meter provided right below the tumble flow control valve. Then, the feedback control of the opening of the tumble flow control valve is performed so that the estimated tumble ratio thus calculated follows a target tumble ratio. The target tumble ratio is set to a value within a permissible control range established for avoiding misfiring and unstable combustion.

SUMMARY OF THE INVENTION

Even if the tumble ratio (the flow rate of the tumble flow/the engine speed) is controlled to be within a certain definite range, the flow rate of the entire tumble flow changes if the engine speed changes. It is difficult to ignite the air-fuel mixture with stability if the flow rate of gas around the ignition plug at the ignition timing is too high or too low. This phenomenon is noticeable particularly when the engine is in lean burn operation under a condition that the fuel concentration of the air-fuel mixture is low, such as when the engine is operated at an air-fuel ratio higher than the stoichiometric ratio, or in EGR operation in which air containing a large amount of EGR gas is burned.

The invention provides a control system for a spark-ignition internal combustion engine, which is conducive to improvement of the ignition performance of an air-fuel mixture.

According to one aspect of the invention, a control system for a spark-ignition internal combustion engine configured to produce tumble flow in a cylinder is provided. The spark-ignition internal combustion engine includes an ignition plug configured to ignite an air-fuel mixture in the cylinder. The control system includes a tumble flow rate controller configured to change a position of a vortex center of the tumble flow as viewed in a direction of a center axis of the cylinder, so as to control a flow rate of the tumble flow around the ignition plug at the ignition timing of the ignition plug.

According to the above aspect of the invention, the flow rate of gas around the ignition plug at the ignition timing can be controlled to be within a range suitable for ignition, without depending on the engine speed. Therefore, the ignition performance of the air-fuel mixture is improved.

In the control system according to the above aspect of the invention, the tumble flow rate controller may be configured to increase the flow rate of a part of the tumble flow at a first point in time. The first point in time may be determined so that the above-indicated part of the tumble flow reaches a position opposite to the ignition plug with respect to the vortex center of the tumble flow, when the ignition timing comes after the flow rate of the above-indicated part of the tumble flow is increased.

With the above arrangement, even if the engine speed is increased, the flow rate of gas around the ignition plug at the ignition timing is less likely or unlikely to be excessively high.

In the control system as described above, the internal combustion engine may include a fuel injection valve configured to inject a fuel into the cylinder such that the injected fuel flows along the tumble flow. The tumble flow rate controller may be configured to cause the fuel injection valve to inject the fuel during an intake stroke or a compression stroke, so as to increase the flow rate of the above-indicated part of the tumble flow by using jet flow of the fuel injected from the fuel injection valve.

With the above arrangement, the flow rate of a part of the tumble flow can be increased by using jet flow of the fuel injected into the cylinder.

In the control system as described above, the tumble flow rate controller may be configured to increase an amount of the jet flow of the fuel injected from the fuel injection valve, so that the position of the vortex center of the tumble flow as viewed in the direction of the center axis of the cylinder at the ignition timing is shifted closer to the ignition plug.

With the above arrangement, the position of the vortex center of the tumble flow relative to the ignition plug as viewed in the direction of the center axis of the cylinder can be adjusted by changing the flow rate of the fuel used in the above-mentioned fuel injection. In this manner, the flow rate of gas around the ignition plug at the ignition timing can be more effectively controlled.

In the control system as described above, the tumble flow rate controller may be configured to raise a pressure of the fuel injected from the fuel injection, valve, so that the position of the vortex center of the tumble flow as viewed in the direction of the center axis of the cylinder at the ignition timing is shifted closer to the ignition plug.

With the above arrangement, the position of the vortex center of the tumble flow relative to the ignition plug as viewed in the direction of the center axis of the cylinder can be adjusted by changing the pressure of the fuel used in the fuel injection. In this manner, the flow rate of gas around the ignition plug at the ignition timing can be more effectively controlled.

In the control system as described above, the tumble flow rate controller may be configured to determine the time of execution of the fuel injection, based on the ignition timing, a tumble ratio, and a jet flow rotation angle required for said part of the tumble flow to reach the position opposite to the ignition plug at the ignition timing.

With the above arrangement, the time of execution of the fuel injection can be appropriately determined so that a part of the tumble flow having an increased flow rate reaches the position opposite to the ignition plug with respect to the vortex center of the tumble flow at the ignition timing.

In the control system as described above, the internal combustion engine may include a burned gas injection valve configured to inject burned gas into the cylinder such that the injected burned gas flows along the tumble flow. The tumble flow rate controller may be configured to cause the burned gas injection valve to inject the burned gas during an intake stroke or a compression stroke, so as to increase the flow rate of said part of the tumble flow, by using jet flow of the burned gas injected from the burned gas injection valve.

With the above arrangement, the flow rate of a part of the tumble flow can be increased by using jet flow of the burned gas injected into the cylinder.

In the control system as described above, the tumble flow rate controller may be configured to increase an amount of the jet flow of the burned gas injected from the burned gas injection valve, such that the position of the vortex center of the tumble flow as viewed in the direction of the center axis of the cylinder at the ignition timing is shifted closer to the ignition plug.

With the above arrangement, the position of the vortex center of the tumble flow relative to the ignition plug as viewed in the direction of the center axis of the cylinder can be adjusted by changing the flow rate of the burned gas used in the above-mentioned injection. In this manner, the flow rate of gas around the ignition plug at the ignition timing can be more effectively controlled.

In the control system as described above, the tumble flow rate controller may be configured to raise a pressure of the burned gas injected from the burned gas injection valve, such that the position of the vortex center of the tumble flow as viewed in the direction of the center axis of the cylinder at the ignition timing is shifted closer to the ignition plug.

With the above arrangement, the position of the vortex center of the tumble flow relative to the ignition plug as viewed in the direction of the center axis of the cylinder can be adjusted by changing the pressure of the burned gas used in the above injection. In this manner, the flow rate of gas around the ignition plug at the ignition timing can be more effectively controlled.

In the control system as described above, the tumble flow rate controller may be configured to determine the time of execution of the burned gas injection, based on the ignition timing, a tumble ratio, and a jet flow rotation angle required for said part of the tumble flow to reach the position opposite to the ignition plug at the ignition timing.

With the above arrangement, the time of execution of the burned gas injection can be appropriately determined so that a part of the tumble flow having an increased flow rate reaches the position opposite to the ignition plug with respect to the vortex center of the tumble flow at the ignition timing.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6 is a view showing a specific example of setting of the fuel injection timing IT in the first embodiment of the invention;

DETAILED DESCRIPTION OF EMBODIMENTS

Figure 1:
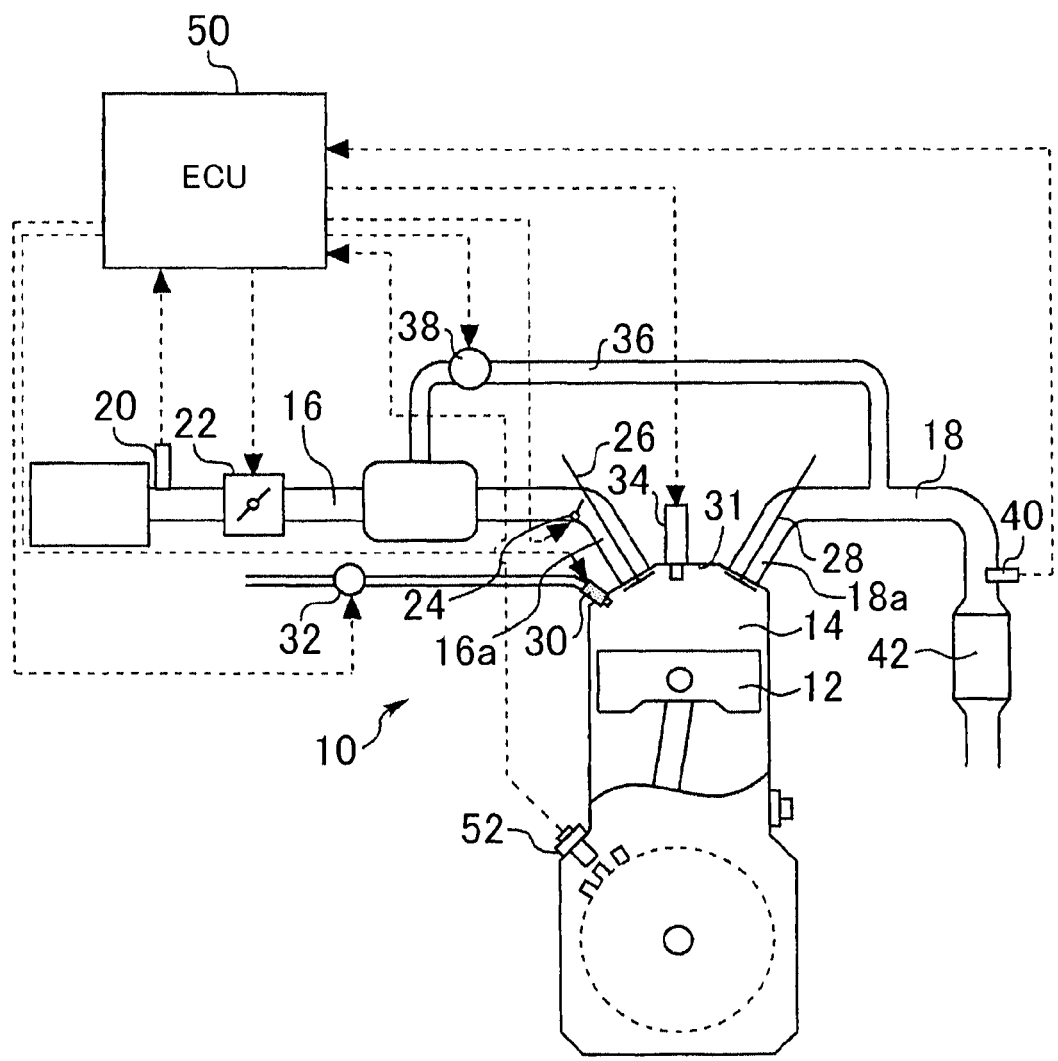
FIG. 1 is a schematic view useful for explaining the system configuration of an internal combustion engine according to a first embodiment of the invention.

FIG. 1 is a schematic view useful for explaining the system configuration of an internal combustion engine 10 according to a first embodiment of the invention. The system of this embodiment includes a spark-ignition internal combustion engine 10. A piston 12 is provided in each cylinder of the engine 10. A combustion chamber 14 is formed above a top face of the piston 12 in the cylinder. An intake passage 16 and an exhaust passage 18 communicate with the combustion chamber 14.

An air flow meter 20 that outputs a signal indicative of the flow rate of air drawn into the intake passage 16 is provided in the vicinity of an inlet of the intake passage 16. An electronically-controlled throttle valve 22 is provided downstream of the air flow meter 20. An electronically-controlled tumble control valve (TCV) 24 is provided in each of branch passages into which the intake passage 16 branches off, toward the respective cylinders. The TCV 24 causes deflection of flow of intake air in each intake port 16a, thereby to produce tumble flow (vertical vortex flow) in the cylinder. The tumble ratio (the angular velocity of the tumble flow/engine speed) can be adjusted by changing the opening of the TCV 24.

Each intake port 16*a* of the intake passage 16 is provided with an intake valve 26 for opening and closing the intake port 16*a*, and each, exhaust port 18*a* of the exhaust passage 18 is provided with an exhaust valve 28 for opening and closing the exhaust port 18*a*. In each cylinder of the internal combustion engine 10, a fuel injection valve 30 for directly injecting fuel into the cylinder is provided. As shown in FIG. 1, the fuel injection valve 30 is mounted in the cylinder head 31, in an end portion (in the vicinity of a side wall of the cylinder) of the combustion chamber 14 closer to the intake valve 26. In operation, fuel that is pressurized by a high-pressure fuel pump 32 is supplied to the fuel injection valve 30 of each cylinder. The flow rate of the injected fuel may be adjusted by controlling the valve-opening period of the fuel injection valve 30 under a given fuel pressure, and the injection pressure of the fuel injected by the fuel injection valve 30 may be adjusted by controlling the rate of discharge flow of the high-pressure fuel pump 32. Also, an ignition plug 34 of an ignition device (not shown) for igniting an air-fuel mixture is provided in each cylinder of the engine 10. More specifically, the ignition plug 34 is mounted in or near a central region of an upper wall (i.e., a wall of the cylinder head) of the combustion chamber 14. Each cylinder has two intake valves 26 that are located adjacent to each other, and two exhaust valves 28 that are located adjacent to each other, on the opposite side of the intake valves 26 (with the ignition plug 34 interposed between the intake valves 26 and the exhaust valves 28).

The internal combustion engine 10 includes an EGR passage 36 that connects the intake passage 16 with the exhaust passage 18. An EGR valve 38 for adjusting the amount of EGR gas (external EGR gas) recirculated into the intake passage 16 via the EGR passage 36 is disposed in the middle of the EGR passage 36. The flow rate of exhaust gas (EGR gas) flowing through the EGR passage 36 is changed by changing the opening of the EGR valve 38, so that the EGR rate can be adjusted. Also, an air-fuel ratio sensor 40 for detecting the air-fuel ratio of exhaust gas is disposed in the exhaust passage 18. An exhaust clean-up catalyst (such as a three-way catalyst) 42 is disposed in the exhaust passage 18 downstream of the air-fuel ratio sensor 40.

The system shown in FIG. 1 is further provided with an ECU (Electronic Control Unit) 50. Various sensors for detecting operating conditions of the internal combustion engine 10 are connected to an input part of the ECU 50. The sensors include a crank angle sensor 52 for detecting the engine speed, and so forth, in addition to the air flow meter 20 and the air-fuel ratio sensor 40 as described above. Also, various actuators for controlling operation of the engine 10 are connected to an output part of the ECU 50. The actuators include the above-described throttle valve 22, TCV 24, fuel injection valve 30, high-pressure fuel pump 32, ignition device, EGR valve 38, and so forth. The ECU 50 is configured to operate various actuators according to detection values of the above-described various sensors, and certain programs, so as to perform certain engine controls, such as fuel injection control and ignition control, and also perform tumble flow rate control as will be described later.

Figure 2:
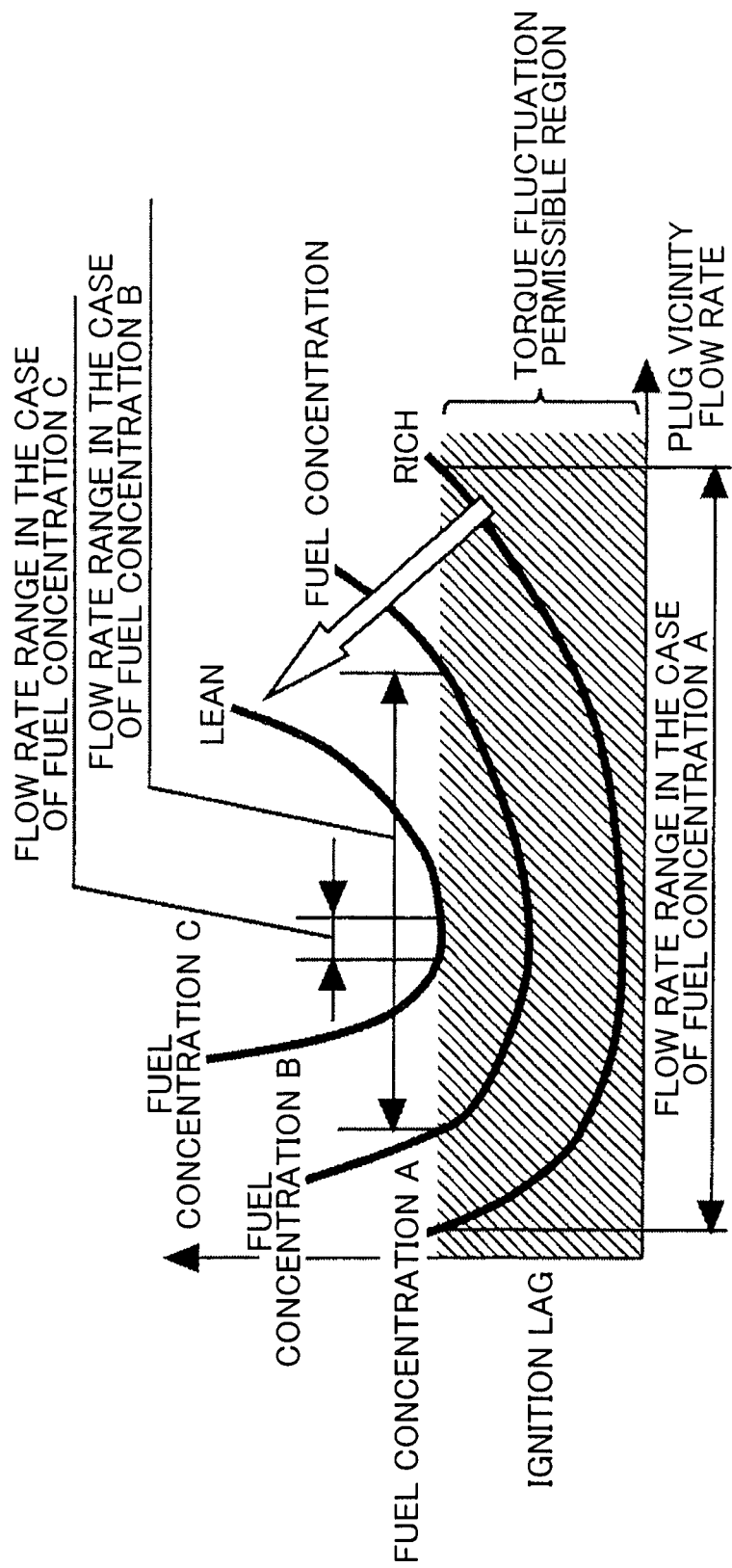
FIG. 2 is a view showing the relationship among the ignition lag of an air-fuel mixture, the flow rate of gas around an ignition plug, and the fuel concentration of the air-fuel mixture.

The need to control the flow rate of gas around the ignition plug at the ignition timing during lean burn operation will be explained. FIG. 2 shows the relationship among the ignition lag of the air-fuel mixture, the flow rate of gas around the ignition plug 34, and the fuel concentration of the air-fuel mixture. The operating region of the engine 10 includes a lean burn operating region in which the engine 10 is operated under a condition that the fuel concentration of the mixture is low (i.e., the ratio of air (including EGR gas when the EGR gas is introduced) to fuel is small). Thus, in this specification, the EGR gas as well as the air is supposed to exist in the air-fuel mixture when the level of the fuel concentration of the mixture is explained. More specifically, the lean burn operation, is performed when the amount of the air or the amount of the EGR gas is larger than that of reference conditions under which the engine is operated at the stoichiometric air-fuel ratio with the EGR rate being equal to zero. Namely, the lean burn operation is performed under a condition that the fuel concentration of the air-fuel mixture is lower than that of the reference conditions. In other words, the lean burn operation is performed under a condition that the fuel concentration of the air-fuel mixture is equal to or lower than a predetermined value (namely, a condition under which the ignitability of the air-fuel mixture may deteriorate (more specifically, the ignition lag may occur)). The lean burn operating region is specified by the engine speed and the engine load.

Accordingly, the lean burn operation mentioned in this specification includes not only the operation performed at an air-fuel ratio higher than the stoichiometric ratio (namely, operation in which the fuel concentration is lowered by increasing the ratio of the amount of air to the amount of fuel), but also the operation performed at a high EGR rate achieved by introduction of a large amount of EGR gas (namely, operation in which the fuel concentration is lowered by increasing the ratio of the amount of EGR gas to the amount of fuel). The operation at the high EGR rate may include operation performed at around the stoichiometric air-fuel ratio.

In the above-described lean burn operation that achieves high thermal efficiency, it is important to lower the fuel concentration of the air-fuel mixture in the cylinder, thereby to reduce NOx discharged from the engine 10. However, during lean burn operation (in particular, during homogeneous lean burn combustion effected by homogeneously forming a lean mixture in the entire volume of the cylinder as in the engine 10 of this embodiment), excessive reduction of the fuel concentration may cause unstable combustion.

As shown in FIG. 2, during lean burn operation, the ignition lag of the air-fuel mixture increases as the fuel concentration is reduced. As the ignition lag increases, torque fluctuation of the engine 10 increases. Also, the ignition lag varies according to the flow rate (which will be called "plug vicinity flow rate") of gas around the ignition plug 34 at the ignition timing. Accordingly, it is necessary to control the plug vicinity flow rate at the ignition timing to be within a certain definite range, so that the ignition lag falls within a range in which the torque fluctuation is equal to or smaller than a permissible level, to achieve stable combustion. The range of the plug vicinity flow rate set for this purpose is narrowed as the fuel concentration becomes lower, as shown in FIG. 2.

The ignition lag and the plug vicinity flow rate are related to each other such that the ignition lag increases as the plug vicinity flow rate becomes higher and higher or lower and lower than a given flow rate value (optimum value). Referring next to FIGS. 3A-3E, the reasons why the ignition lag increases on the higher flow rate side and the lower flow rate side will be described. FIG. 3A through FIG. 3E illustrate the behaviors of a discharge spark during a discharge period in the case where a discharge spark cuts off, which behaviors occur successively in the order of FIGS. 3A, 3B, 3C, 3D and 3E with time.

Figure 3:
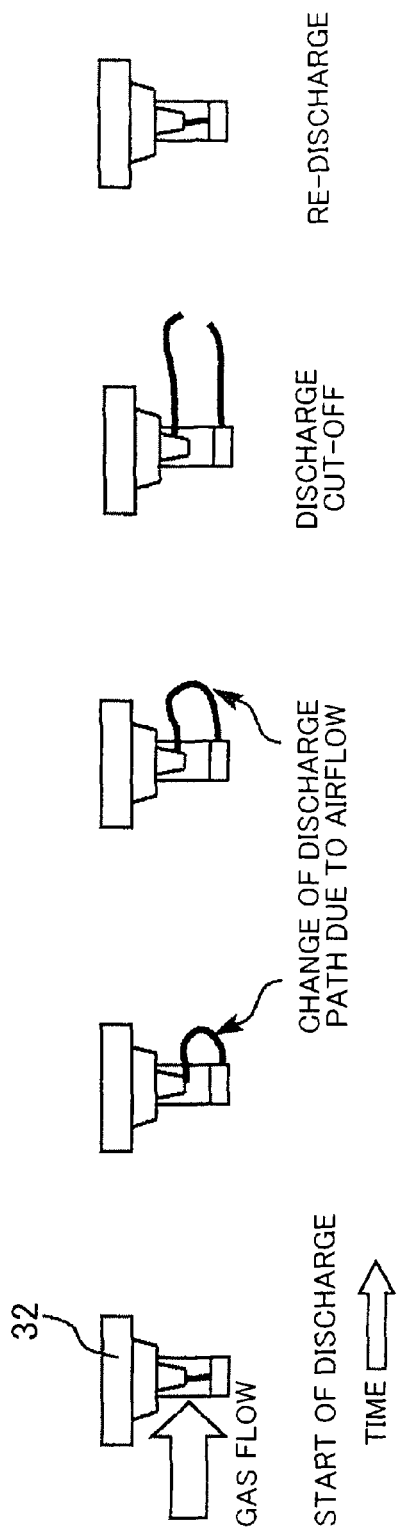
FIG. 3A through FIG. 3E are views showing the behaviors of a discharge spark during a discharge period with respect to time, in the case where the discharge spark cuts off.

After discharge is started as shown in FIG. 3A, an electric spark produced in a plug gap is caused to drift away as shown in FIG. 3B and FIG. 3C, due to flow of gas around the ignition plug 34. As a result, the discharge path length is increased. Once discharge occurs, gas on the path of the discharge spark is ionized, and its electric resistance is reduced. However, if the discharge path length is increased because of a high plug vicinity flow rate, the electric resistance value on the discharge path becomes larger than that of the plug gap having the shortest distance, and discharge spark cutoff occurs as shown in FIG. 3D. When the discharge spark cutoff occurs, re-discharge immediately takes place in the plug gap having the shortest distance, as shown in FIG. 3E.

First, the reason why the ignition performance deteriorates on the higher flow rate side will be explained. Under a situation where the fuel concentration is in the vicinity of a lean flammability limit, it requires a certain period of time for the air-fuel mixture to reach ignition (initiate a chemical reaction). As the plug vicinity flow rate increases, the time it takes until the discharge spark cutoff occurs is shortened; therefore, the time it takes the same air-fuel mixture at a certain position to be heated by an electric spark and reach ignition becomes insufficient. As a result, the ignition performance deteriorates.

Secondly, the reason why the ignition performance deteriorates on the lower flow rate side will be explained. The energy per unit length of electric spark generated by discharge is determined by characteristics of the ignition coil, and is constant irrespective of the length of the discharge path. Therefore, as the discharge path length is increased due to airflow, or the like, the energy supplied to the mixture as a whole increases, and the volume of the mixture heated also increases. However, if the plug vicinity flow rate is reduced, the discharge path is less likely to be extended, resulting in no increases in the energy supplied and the volume of the mixture. As a result, the ignition performance deteriorates.

As described above, it is necessary to hold the plug vicinity flow rate at the ignition timing within a certain definite range, so as to control the ignition lag to be within the range in which the torque fluctuation is equal to or lower than the permissible level, thereby to achieve stable combustion. However, the flow rate of gas flowing into the cylinder is proportional to the engine speed. Accordingly, if no control is performed on the plug vicinity flow rate, the plug vicinity flow rate monotonously increases in proportion to the engine speed. Therefore, if the tumble ratio is set so as to ensure a favorable plug vicinity flow rate in a low engine-speed region, the plug vicinity flow rate becomes excessively large in a high engine-speed region.

The control of the plug vicinity flow rate at the ignition timing in the first embodiment will be described. In the first embodiment, the base tumble ratio TR is set using the TCV 24, so that the plug vicinity flow rate within a specific optimum ignition range (the flow rate range shown in FIG. 2) suitable for lean burn operation can be obtained at the ignition timing in the low engine-speed region. The base tumble ratio TR mentioned herein is basically a value uniformly used irrespective of the level of the engine speed.

In the first embodiment, when the ignition performance of the mixture is expected to deteriorate due to an excessive increase of the plug vicinity flow rate, under a situation where the tumble flow is produced in the cylinder at the base tumble ratio TR, fuel injection as described below is performed using the fuel injection valve 30 capable of injecting fuel directly into the cylinder. Namely, a small amount of fuel is injected (which will be called "minute injection") at a given fuel injection time IT during the intake stroke or compression stroke, so as to change the position of the vortex center of the tumble flow as viewed in the direction of the center axis of the cylinder, thereby to control the plug vicinity flow rate at the ignition timing.

Figure 4:
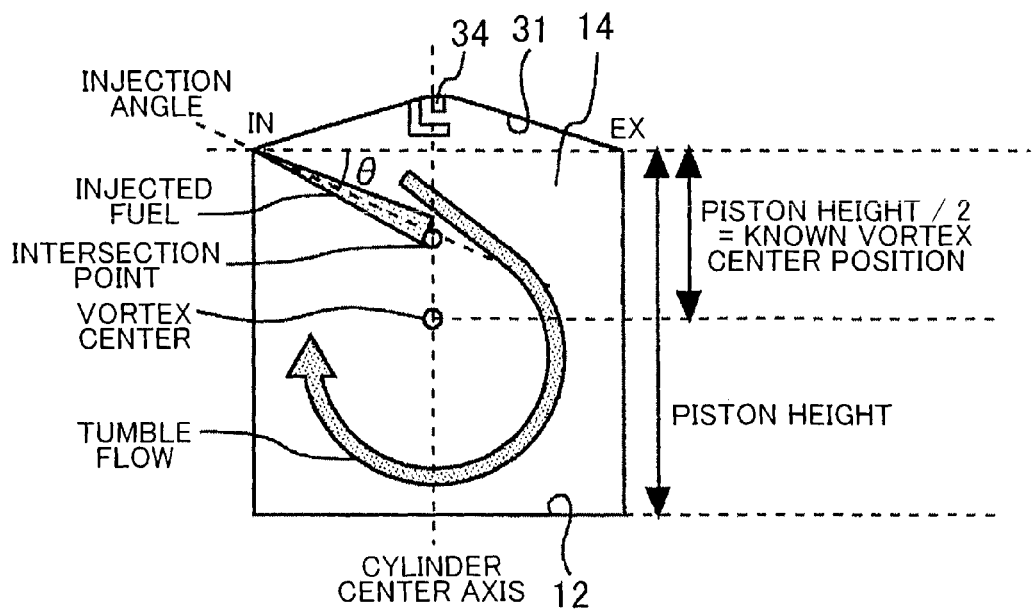
FIG. 4 is a view useful for explaining the injection angle of fuel injected by a fuel injection valve, and the fuel injection timing IT of minute injection.
Figure 5:
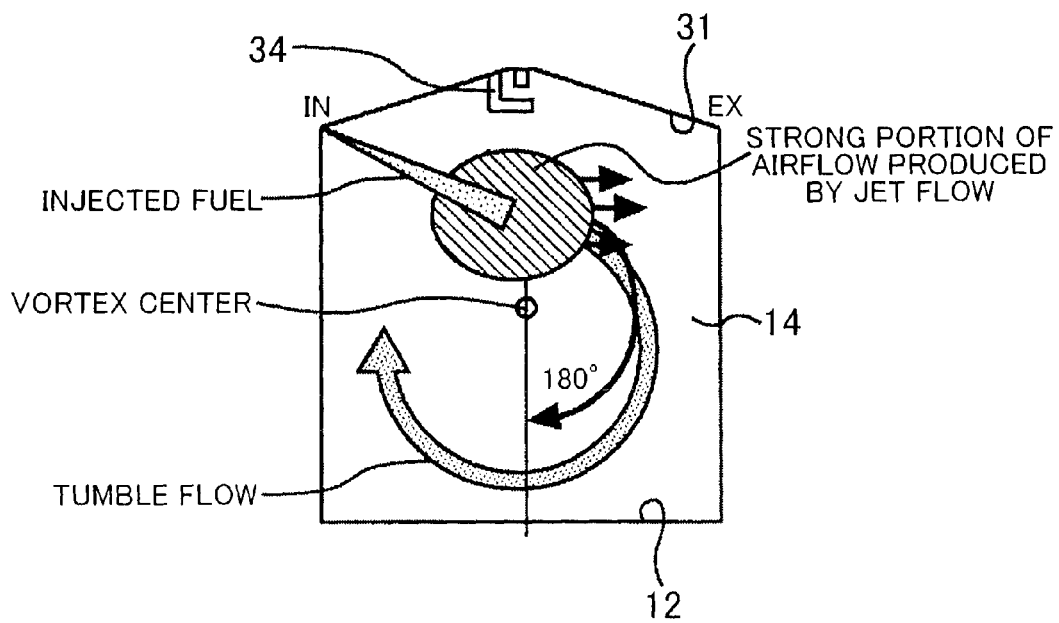
FIG. 5 is a view showing distribution of strong and weak portions produced in tumble flow due to minute injection of fuel.

FIG. 4 is a view useful for explaining the injection angle of the fuel injected from the fuel injection valve 30, and the fuel injection timing IT of the minute injection. FIG. 5 is a view showing distribution of strong and weak portions produced in the tumble flow due to the minute injection of the fuel.

The minute injection of the first embodiment is a split injection conducted using a part of the fuel injection amount for obtaining the required torque. When the minute injection is not conducted, the position of the vortex center of the tumble flow (a known vortex center position shown in FIG. 4) is located at one half of the piston height as the distance between the top face of the piston 12 and an end face of the cylinder head 31. This relationship is maintained even in the course of elevating the piston 12.

The fuel injection valve 30 is positioned so as to inject fuel toward the center axis of the cylinder. Furthermore, as shown in FIG. 4, the injection angle of the fuel injected from the fuel injection valve 30 is set so that a point of intersection between a virtual line indicating the injection direction and the center axis of the cylinder is located at an upper position (position closer to the ignition plug 34) than the vortex center of the tumble flow as viewed in the direction of the cylinder center axis, during execution of the minute injection. The minute injection is conducted at the fuel injection timing IT that satisfies a condition that the jet flow reaches the upper position than the vortex center of the tumble flow as viewed in the direction of the cylinder center, axis, so that the injected fuel flows along the tumble flow. More specifically, since the vortex center of the tumble flow is kept at a position corresponding to one half of the piston height while the piston 12 moves up and down as described above, the crank angle period that satisfies the condition that the point of intersection lies above the vortex center is specified, according to the injection angle of the fuel injection valve 30 (the angle of inclination θ of the injection direction relative to the horizontal line in FIG. 4). More specifically, as the inclination angle θ is larger, the crank angle period is shortened. As will be described later, the fuel injection timing IT is a given point in time (during the intake stroke or the compression stroke) in the thus specified crank angle period.

With the minute injection thus conducted at the fuel injection timing IT, the flow rate of a part of the tumble flow is increased due to the jet flow of the fuel, so that strong and weak portions are distributed in the tumble flow. The fuel injection timing IT is determined as the timing with which the part of the tumble flow having a high flow rate rotates, and reaches a position opposite to the ignition plug 34 (namely, a position closer to the top face of the piston 12), with respect to the vortex center of the tumble flow at the ignition timing. When the fuel injection valve 30 is mounted in the vicinity of a side wall of the cylinder, as in the engine 10 of this embodiment, the jet flow rotation angle Δθ required for the part of tumble flow having the increased flow rate due to the jet flow of the fuel caused by the minute injection to reach the above-indicated position at the ignition timing is about 180° as shown in FIG. 5. The fuel injection timing IT required to achieve the above-described movement of the high-flow-rate part of the tumble flow may be set in the following manner, based on the ignition timing SA, the base tumble ratio TR, and the jet flow rotation angle Δθ.

Where ΔT represents the crank angle period from the fuel injection timing IT to the ignition timing SA (compatible value), ΔT is expressed by Eq. (1) as indicated below. The above-mentioned jet flow rotation angle Δθ is a value corresponding to the angle by which the tumble flow rotates during the crank angle period ΔT, and is expressed by Eq. (2) as indicated below, using the tumble ratio TR and the crank angle period ΔT. Here, the tumble ratio TR is an index value that is equal to 1 when the tumble flow rotates one revolution while the crankshaft rotates one revolution. If Eq. (1) is modified in view of the relationship of Eq. (2), the fuel injection timing IT is expressed by Eq. (3) as indicated below, based on the ignition timing SA, tumble ratio TR, and the jet flow rotation angle Δθ.

$$\Delta T = IT - SA \quad (1)$$

$$\Delta\theta = 360 \times TR \times \Delta T / 360 TR \times \Delta T \quad (2)$$

$$IT = SA + \Delta\theta / TR \quad (3)$$

In the first embodiment, the fuel injection timing IT is determined so that the jet flow rotation angle Δθ becomes equal to 180°, using the tumble flow. Even if the jet flow rotation angle Δθ is the same value, the crank angle period ΔT changes depending on the base tumble ratio TR, as is understood from the above equation (2), and the fuel injection timing IT changes depending on the tumble ratio TR and the ignition timing SA, as is understood from the above equation (3).

FIG. 6 shows a specific example of setting of the fuel injection timing IT in the first embodiment. Here, the crank angle (deg) is expressed as an angle before the compression top dead center (BTDC) as an index. This also applies to FIG. 14 which will be described later. FIG. 6 shows the results of calculation of the fuel injection timing IT corresponding to the tumble ratio TR in the case where the ignition timing SA is set to 40 BTDC by way of example. More specifically, if the tumble ratio. TR is 1, the crank angle period ΔT becomes equal to 180° when the jet flow rotation angle Δθ is 180° according to Eq. (2). Accordingly, the fuel injection timing IT becomes equal to 220 BTDC according to Eq. (1) or Eq. (3). Similarly, if the tumble ratio TR is 1.5, the crank angle period ΔT becomes equal to 120°, and therefore, the fuel injection timing IT becomes equal to 160 BTDC. Similarly, if the tumble ratio TR is 2, the crank angle period ΔT becomes equal to 90°, and therefore, the fuel injection timing IT becomes equal to 130 BTDC.

As described above with reference to FIG. 4, the crank angle period that satisfies the condition that the injected fuel flows along the tumble flow varies depending on the injection angle θ. If there exists a fuel injection timing IT that satisfies a condition that the jet flow rotation angle Δθ is 540° (namely, the rotation angle when the tumble flow rotates another revolution after rotating 180° above) within the crank angle period that satisfies the above condition, the fuel injection timing IT may be used. In the example of FIG. 6, when the tumble ratio TR is 2, the fuel injection timing IT corresponding to 270° as a value of the crank angle period ΔT when the jet flow rotation angle Δθ is 540° may be calculated as 310 BTDC as a point in time during the intake stroke. Accordingly, this point in time may be used as the fuel injection timing IT, depending on the injection angle θ.

Figure 7A:
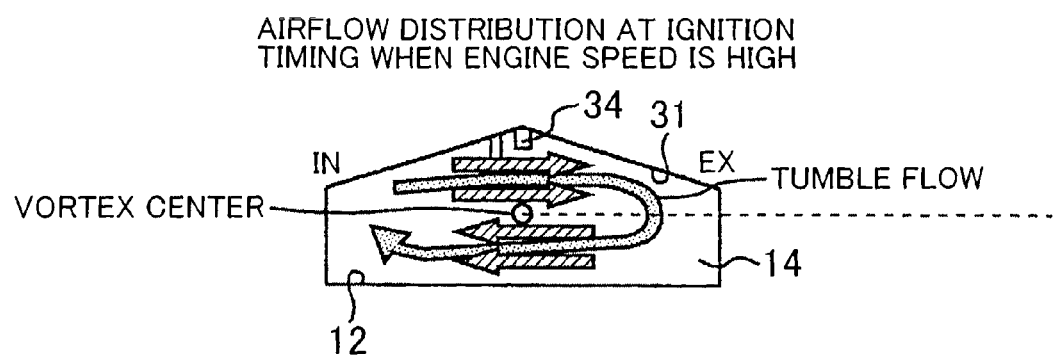
FIG. 7A is a view showing airflow distribution at the ignition timing when the gas flow rate control of the first embodiment of the invention is not performed.
Figure 7B:
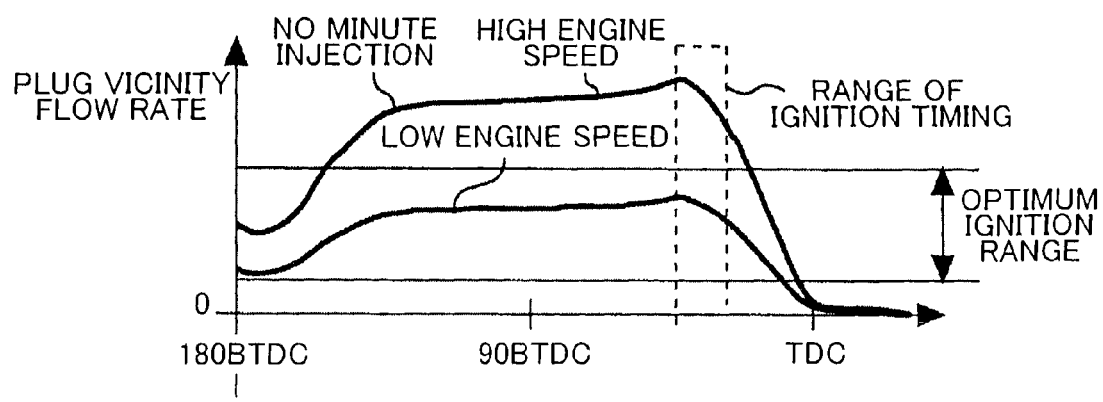
FIG. 7B is a view showing waveforms of the plug vicinity flow rate at the ignition timing when the gas flow rate control of the first embodiment of the invention is not performed.
Figure 8A:
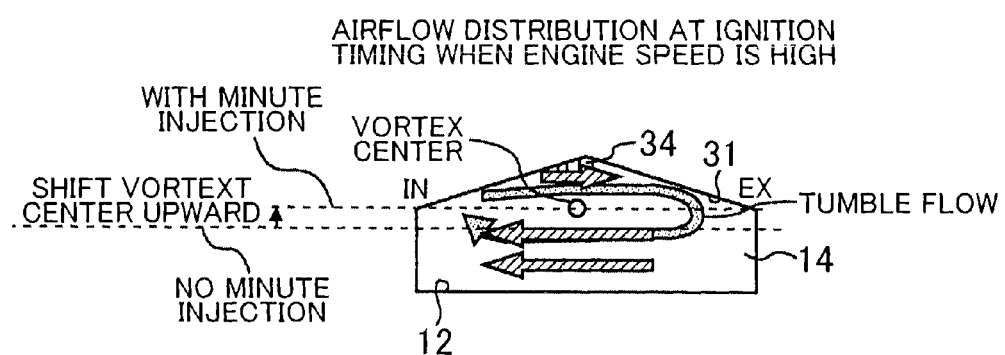
FIG. 8A is a view showing airflow distribution at the ignition timing when the gas flow rate control of the first embodiment of the invention is performed.
Figure 8B:
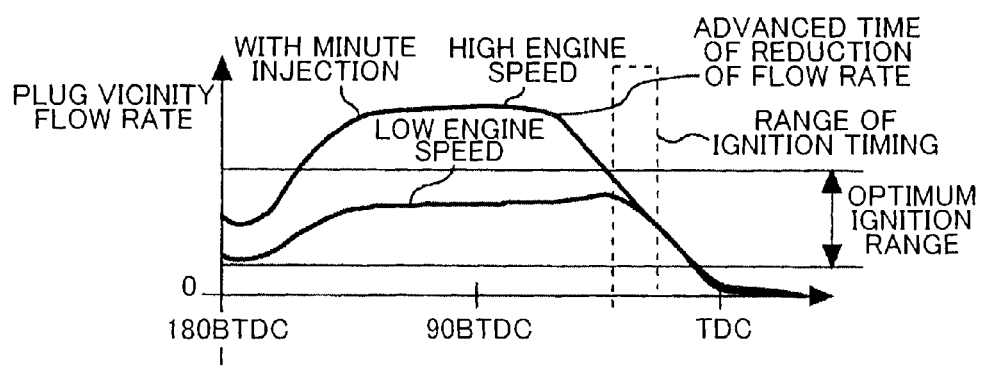
FIG. 8B is a view showing waveforms of the plug vicinity flow rate at the ignition timing when the gas flow rate control of the first embodiment of the invention is performed.

FIG. 7A and FIG. 7B are referred to for the sake of comparison, and FIG. 7A shows airflow distribution at the ignition timing when the gas flow rate control of the first embodiment is not performed, while FIG. 7B shows waveforms of the plug vicinity flow rate. FIG. 8A shows airflow distribution at the ignition timing when the gas flow rate control of the first embodiment is performed, and FIG. 8B shows waveforms of the plug vicinity flow rate. In FIG. 7B and FIG. 8B, the plug vicinity flow rate assumes positive values when the gas flows from the intake side to the exhaust side.

With the minute injection of this embodiment, the flow rate of a part of the tumble flow is increased, so that strong and weak portions can be distributed in the tumble flow, as described above. When the minute injection is not conducted, the vortex center of the tumble flow is located below the ignition plug (on the piston side) as shown in FIG. 7A, at the time (the time advanced a given period from the compression top dead center) to which the ignition timing SA is generally set.

The inventor of this invention found that, if the minute injection is carried out at the fuel injection timing IT so that a part of the tumble flow having a high flow rate reaches the above-indicated opposite position (i.e., the position closer to the top face of the piston 12) at the ignition timing, the position of the vortex center of the tumble flow at the ignition timing is shifted upward (i.e., toward the ignition plug 34), as compared with the case where the minute injection is not conducted, as is understood from comparison between FIG. 7A and FIG. 8A. Thus, in the first embodiment, the minute injection is carried out at the fuel injection timing IT as described above, in a region where the ignition performance of the mixture may deteriorate.

As is understood from comparison between FIG. 7B and FIG. 8B, the time at which the plug vicinity flow rate starts decreasing can be advanced by elevating the vortex center position of the tumble flow through the minute injection so as to make it closer to the ignition plug 34. In this manner, the plug vicinity flow rate at the ignition timing can be lowered. Therefore, even when the engine speed is high, and the plug vicinity flow rate at the ignition timing would fall outside the optimum ignition range if no countermeasure is taken, as shown in FIG. 7B, the plug vicinity flow rate at the ignition timing can be held within the optimum ignition range as shown in FIG. 8B.

If the amount of fuel injected in the minute injection is increased too much, the velocity of the tumble flow itself may be increased. Accordingly, the amount of fuel used in the minute injection of the first embodiment is set to a value predetermined by experiment, or the like, in advance, as such a small amount that only increases the flow rate of a part of the tumble flow, but does not increase the velocity of the entire tumble flow. The inventor of this invention further found that, if the amount of fuel used in the minute injection is within a range of small amounts in which the flow rate of a part of the tumble flow, rather than the entire tumble flow, is increased, distribution of strong and weak portions that vary in strength by larger degrees can be produced in the tumble flow, and the vortex center position of the tumble flow can be further elevated (namely, the vortex center can be made closer to the ignition plug 34), as the amount of fuel used in the minute injection is larger. Thus, in this embodiment, in the region where the ignition performance of the mixture may deteriorate, the amount of fuel injected in the minute injection is increased as the engine speed is higher.

Figure 9:
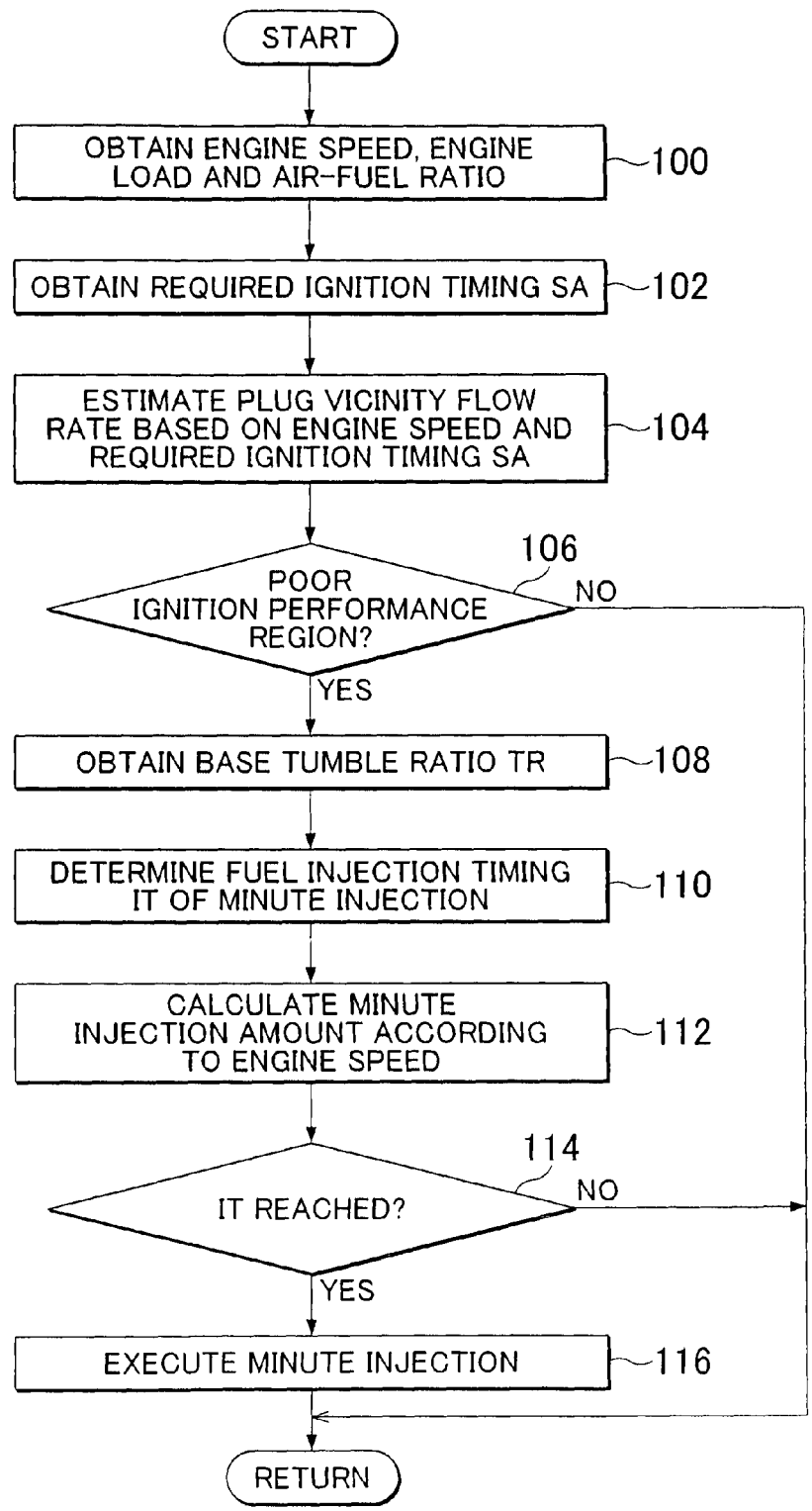
FIG. 9 is a flowchart of a routine executed in the first embodiment of the invention.

A specific process performed by the ECU 50 according to the first embodiment will be described. FIG. 9 is a flowchart illustrating a routine executed by the ECU 50 for implementing the gas flow rate control according to the first embodiment. The routine of FIG. 9 is repeatedly executed for each cycle in each cylinder.

In the routine shown in FIG. 9, the ECU 50 initially obtains the engine speed, engine load factor, and the air-fuel ratio (step 100). The engine speed may be calculated using the crank angle sensor 52, and the engine load factor may be calculated based on the intake air amount measured by the air flow meter 20, and the engine speed. The air-fuel ratio may be detected using the air-fuel ratio sensor 40.

Then, the ECU 50 obtains the required ignition timing SA. The ECU 50 stores a map (not shown) that defines the required ignition timing SA in advance, in relation to the engine speed, engine load factor, and the air-fuel ratio. In step 102, the required ignition timing SA is obtained with reference to the map.

Then, the ECU 50 estimates the plug vicinity flow rate at the ignition timing, based on the engine speed and the required ignition timing SA (step 104). As shown in FIG. 8B, etc., the plug vicinity flow rate changes according to the ignition timing as well as the engine speed. In this example, the ECU 50 stores a map (not shown) in which the plug vicinity flow rate at the ignition timing is determined in advance in relation to the engine speed and the required ignition timing SA. The plug vicinity flow rate at the ignition timing can be calculated with reference to this map.

Then, the ECU 50 determines whether the operating region of the internal combustion engine 10 is in a poor ignition performance region (i.e., a region in which the ignition performance is likely to deteriorate) (step 106). More specifically, it is determined whether the plug vicinity flow rate at the ignition timing is higher than a given criterial value. The criterial value mentioned herein is a value corresponding to the upper limit of the optimum ignition range as shown in FIG. 8B, etc.

If an affirmative decision (YES) is obtained in step 106, namely, if it is determined that the plug vicinity flow rate at the ignition timing is excessively high, the ECU 50 then obtains the base tumble ratio TR (step 108). The base tumble ratio TR mentioned herein is determined in advance as a fixed value irrespective of the engine speed. However, the minute injection of this embodiment may also be applied to a system in which the tumble ratio TR is changed according to various operating conditions, such as the engine speed.

Then, the ECU 50 determines the fuel injection timing IT of minute injection (step 110). The fuel injection timing IT is calculated by the above-described method, based on the required ignition timing SA, base tumble ratio TR, and the jet flow rotation angle $\Delta\theta$. The jet flow rotation angle $\Delta\theta$ is a value (180° in this embodiment) determined in advance in view of the position of installation of the fuel injection valve 30, and the injection angle.

Figure 10:
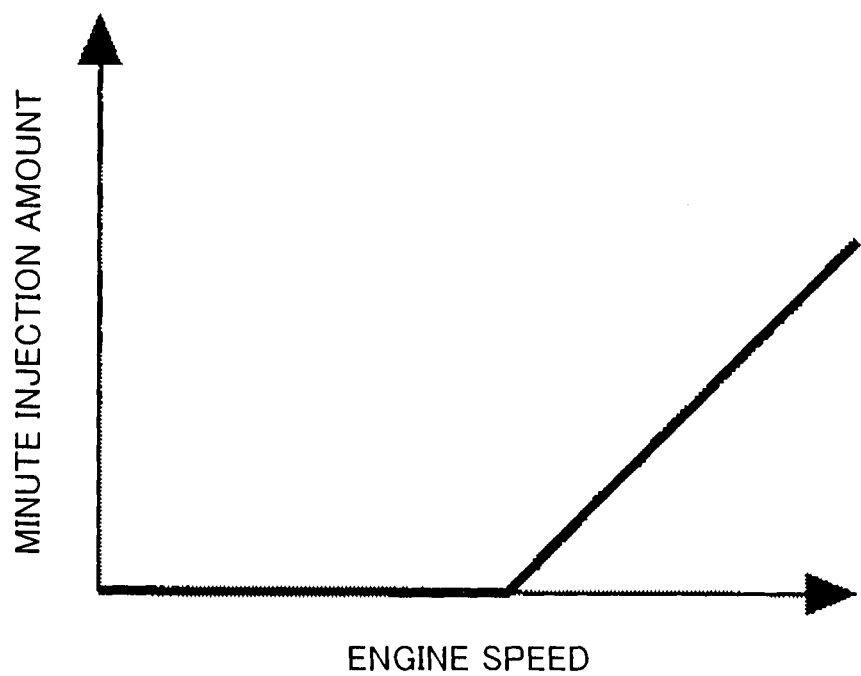
FIG. 10 is a view showing the relationship between the engine speed and the amount of minute injection.

Then, the ECU 50 calculates the minute injection amount as the amount of fuel injected in the minute injection (step 112). FIG. 10 indicates the relationship between the engine speed and the minute injection amount. As shown in FIG. 10, the minute injection amount is set so as to increase as the engine speed is higher, in the poor ignition performance region. The ECU 50 stores a map that defines the predetermined relationship as shown in FIG. 10, and calculates the minute injection amount in step 112 according to the engine speed, with reference to the map stored therein. Preferably, the amount of fuel injected in this cycle is obtained by subtracting the calculated amount of minute injection from the fuel injection amount required to provide torque required to be produced by the engine 10.

Then, the ECU 50 determines whether the fuel injection timing IT comes, using the crank angle sensor 52 (step 114). If an affirmative decision (YES) is obtained in step S114, the ECU 50 executes minute injection (step 116).

According to the routine shown in FIG. 10 as explained above, the minute injection is carried out, in the poor ignition performance region in which the plug vicinity flow rate at the ignition timing would be excessively high. It is thus possible to increase the flow rate of a part of the tumble flow, and produce distribution of strong and weak portions in the tumble flow, by using jet flow of fuel caused by the minute injection. By producing distribution of strong and weak portions in the tumble flow through the minute injection at the above-described fuel injection timing IT, it is possible to make the vortex center position of the tumble flow at the ignition timing closer to the ignition plug 34, as compared with the time when the minute injection is not conducted. Thus, through the minute injection, the vortex center of the tumble flow is changed, so that the airflow distribution in the cylinder at the ignition timing can be changed. As a result, even when the engine speed is high, the plug vicinity flow rate at the ignition timing is less likely or unlikely to be excessively high. In this manner, the plug vicinity flow rate at the ignition timing can be controlled to be within the optimum ignition range, irrespective of the level of the engine speed. Therefore, the ignition performance during lean burn operation can be improved.

The amount of fuel injected in the minute injection of the first embodiment is not so large as to increase the entire tumble flow. Namely, the minute injection changes the plug vicinity flow rate at the ignition timing, without changing the tumble ratio in the cylinder. Therefore, it is possible to control the plug vicinity flow rate while maintaining the turbulence intensity of the gas flow in the cylinder as a dominant factor of the combustion speed. Also, since the amount of fuel injected is so small, the degree of homogeneity of the air-fuel mixture in the cylinder is not deteriorated due to the fuel injection for the gas flow rate control.

As described above, if any special control, such as the minute injection, is not performed, the plug vicinity flow rate at the ignition timing increases as the engine speed is higher. According to the above routine, the amount of minute injection is increased as the engine speed is higher in the poor ignition performance region. Thus, as the engine speed is higher, the vortex center of the tumble flow is changed by a larger degree, and the vortex center can be made closer to the ignition plug 34. Consequently, the amount of reduction of the plug vicinity flow rate at the ignition timing can be increased; therefore, the plug vicinity flow rate at the ignition timing can be controlled with higher reliability to be within the optimum ignition range, without depending on the level of the engine speed.

In the meantime, in the above-described first embodiment, the amount of minute injection is increased as the engine speed is higher in the poor ignition performance region. However, it is also possible to similarly intensify a part of the tumble flow by raising the pressure (injection pressure) of the fuel injected in the minute injection, instead of increasing the amount of minute injection. As a result, distribution of strong and weak portions that vary in strength by larger degrees can be produced in the tumble flow, so that the vortex center of the tumble flow can be further elevated, to be closer to the ignition plug 34. Accordingly, in the poor ignition performance region, the pressure of the fuel injected in the minute injection may be increased as the engine speed is higher, instead of or in addition to increasing the amount of fuel injected in the minute injection.

In the first embodiment as described above, the ECU 50 controls the fuel injection valve 30 by executing a series of steps in the routine as illustrated in FIG. 9, so as to provide "tumble flow rate controller" according to the invention.

Referring next to FIG. 11 to FIG. 14, a second embodiment of the invention will be described.

Figure 11:
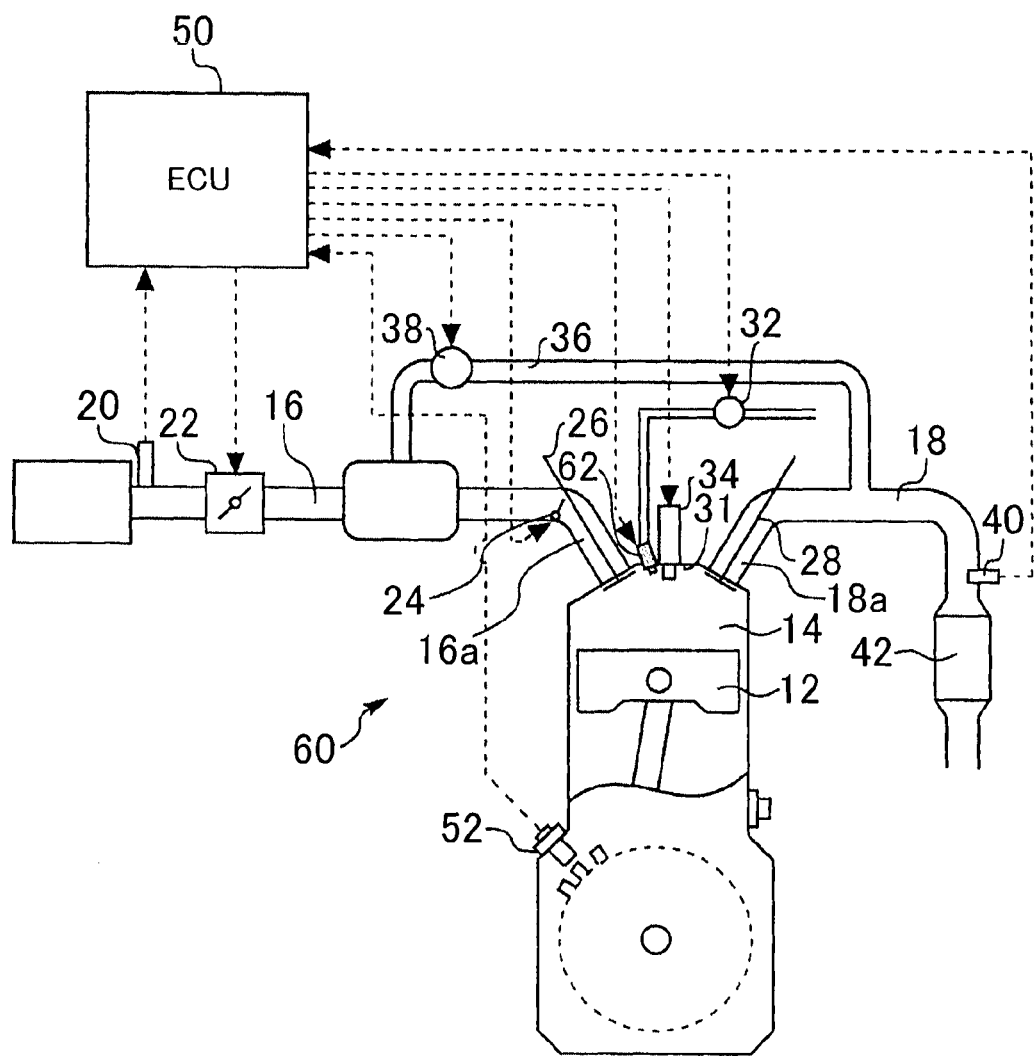
FIG. 11 is a schematic view useful for explaining the system configuration of an internal combustion engine according to a second embodiment of the invention.

Initially, the system configuration of the second embodiment will be described. FIG. 11 is a schematic view useful for explaining the system configuration of an internal combustion engine 60 of the second embodiment. In FIG. 11, the same reference numerals used in FIG. 1 are assigned to the same constituent elements as those shown in FIG. 1, and explanation of these elements will be simplified or not provided.

The internal combustion engine 60 of this embodiment is constructed similarly to the internal combustion engine 10 of the first embodiment, except that the position of installation of a fuel injection valve 62 of an in-cylinder direct injection type is different from that of the fuel injection valve 30. More specifically, the fuel injection valve 62 is mounted in the vicinity of a central portion of an upper wall of the combustion chamber 14, at a position adjacent to the ignition plug 34.

Figure 12:
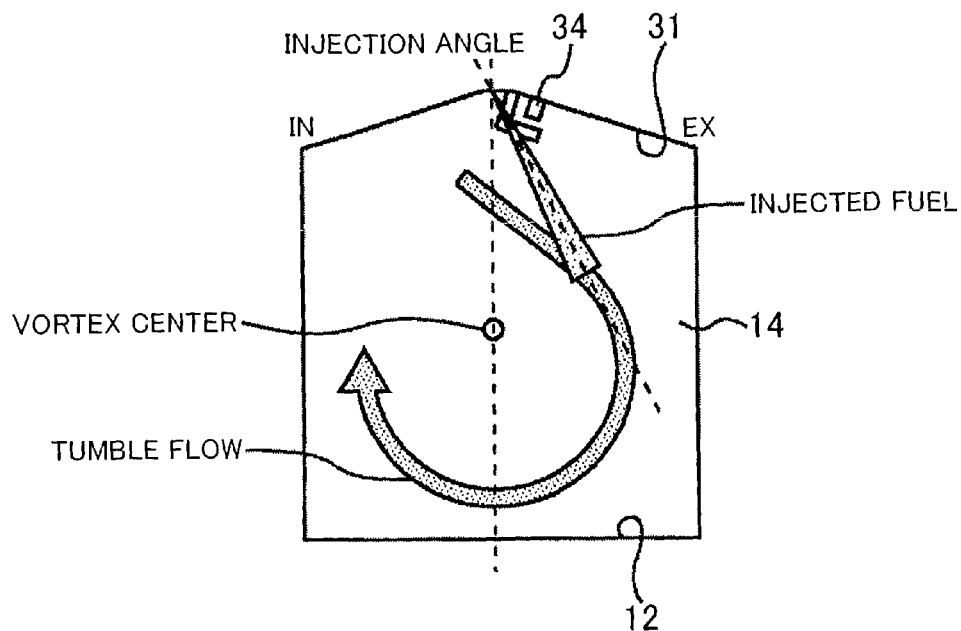
FIG. 12 is a view useful for explaining the injection angle of fuel injected by a fuel injection valve, and the fuel injection timing IT of minute injection.
Figure 13:
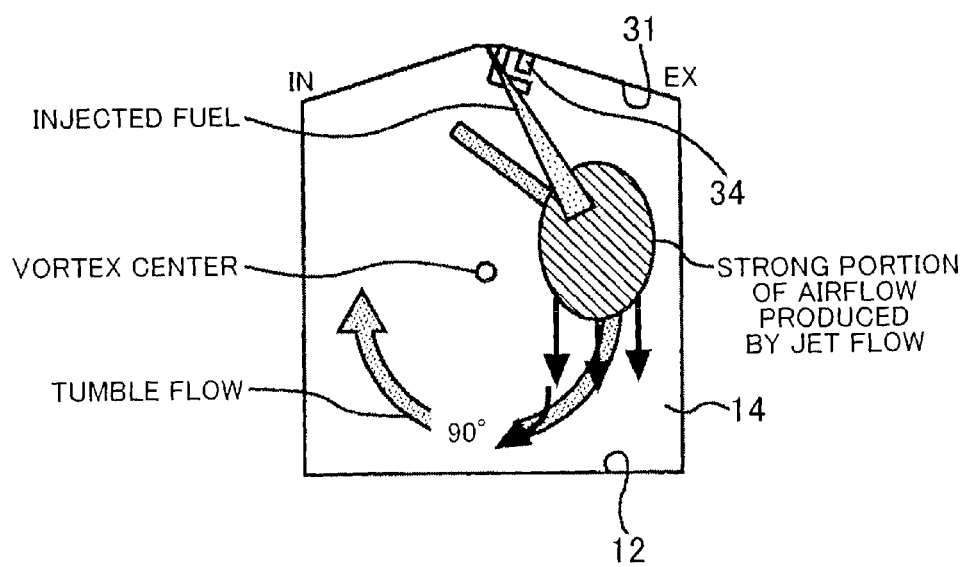
FIG. 13 is a view showing distribution of strong and weak portions produced in tumble flow due to the minute injection of the fuel.

Next, control of the plug vicinity flow rate at the ignition timing according to the second embodiment will be described. FIG. 12 is a view useful for explaining the injection angle of the fuel injected by the fuel injection valve 62, and the fuel injection timing IT of minute injection. FIG. 13 is a view showing distribution of strong and weak portions produced in the tumble flow through the minute injection of the fuel.

In this embodiment, too, the minute injection is utilized based on the same concept as that of the first embodiment, for controlling the plug vicinity flow rate at the ignition timing. With the fuel injection valve 62 thus mounted at the center of the upper wall of the combustion chamber 14, the injection angle is set so that the fuel is injected toward exhaust-side space relative to the central axis of the cylinder as shown in FIG. 12. With the injection angle set in this manner, the injected fuel flows along the tumble flow without depending on the injection timing.

Where the fuel injection valve 62 is mounted at the center of the upper wall of the combustion chamber 14, the jet flow rotation angle $\Delta\theta$ required for a part of the tumble flow having an increased flow rate due to jet flow of fuel through the minute injection to reach the above-indicated opposite position (position closer to the top face of the piston 12) at the ignition timing is about 90° as shown in FIG. 13. Accordingly, the fuel injection timing IT used in this embodiment is determined so that the jet flow rotation angle $\Delta\theta$ becomes equal to 90° or 450° (the rotation angle when the tumble flow rotates another revolution after rotating 90°).

Figures 14, 15:
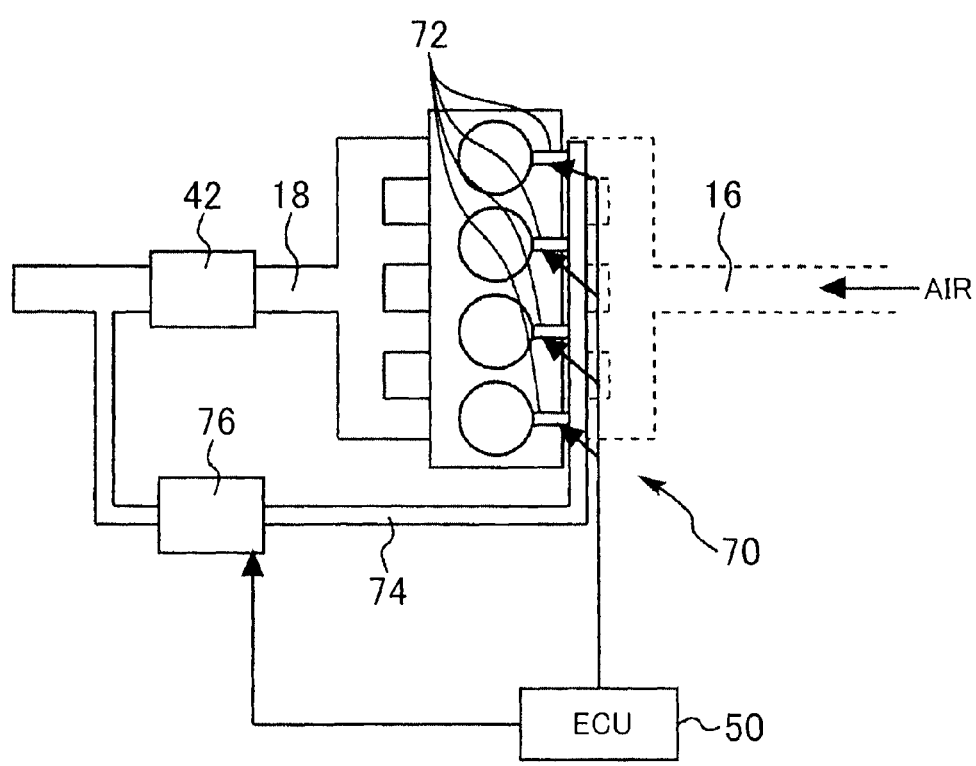
FIG. 14 is a view showing a specific example of setting of the fuel injection timing IT in the second embodiment of the invention.
FIG. 15 is a schematic view useful for explaining the system configuration of an internal combustion engine according to a third embodiment of the invention.

FIG. 14 shows a specific example of setting of the fuel injection timing IT in the second embodiment. FIG. 14 shows the results of calculation of the fuel injection timing IT corresponding to the tumble ratio TR in the case where the ignition timing SA is set to 40 BTDC by way of example. More specifically, on the basis of the same concept as that described above in the first embodiment, if the tumble ratio TR is 1, the crank angle period $\Delta T$ becomes equal to 90° when the jet flow rotation angle $\Delta\theta$ is 90°; therefore, the fuel injection timing IT becomes equal to 130 BTDC. Similarly, if the tumble ratio TR is 1.5, the crank angle period $\Delta T$ becomes equal to 60° when the jet flow rotation angle $\Delta\theta$ is 90°, and the crank angle period $\Delta T$ becomes equal to 300° when the jet flow rotation angle $\Delta\theta$ is 450°. Accordingly, the fuel injection timing IT becomes equal to 100 BTDC (during the compression stroke) or 340 BTDC (during the intake stroke). Similarly, if the tumble ratio TR is 2, the crank angle period $\Delta T$ becomes equal to 45° when the jet flow rotation angle $\Delta\theta$ is 90°, and the crank angle period $\Delta T$ becomes equal to 225° when the jet flow rotation angle $\Delta\theta$ is 450°. Accordingly, the fuel injection timing IT becomes equal to 85 BTDC (during the compression stroke), or 265 BTDC (during the intake stroke).

A specific process of the second embodiment will be described. The tumble flow rate control of the second embodiment is substantially the same as the tumble flow rate control of the first embodiment, except that the jet flow rotation angle $\Delta\theta$ is set to 90° (or 450°). Accordingly, the operation of step 112 is modified so that the fuel injection timing IT is determined using 90°, (or 450°) instead of 180° as the jet flow rotation angle $\Delta\theta$, to provide a routine similar to the routine of the first embodiment as shown in FIG. 9. The ECU 50 executes this routine so as to implement the tumble flow rate control of the second embodiment. Thus, the tumble flow rate control of the second embodiment provides substantially the same effect as that of the first embodiment.

Figure 16:
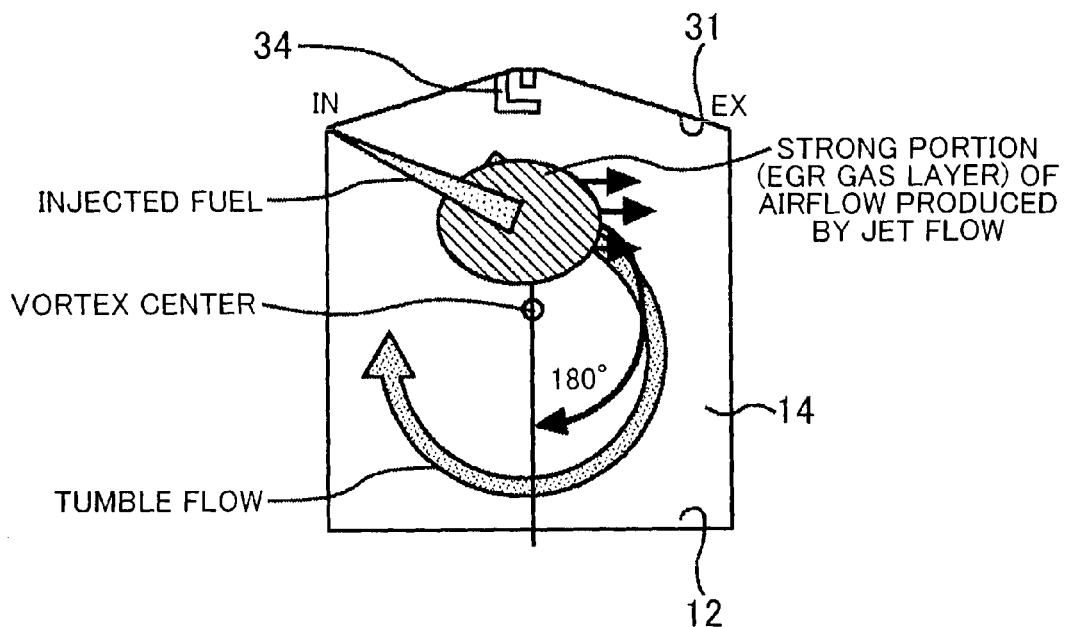
FIG. 16 is a view showing distribution of strong and weak portions produced in tumble flow due to minute injection of burned gas.

Next, a third embodiment of the invention will be described with reference to FIG. 15 through FIG. 17.

FIG. 15 is a schematic view useful for explaining the system configuration of an internal combustion engine 70 of the third embodiment. In FIG. 15, the same reference numerals used in FIG. 1 are assigned to the same constituent elements shown in FIG. 15 as the constituent elements shown in FIG. 1, and explanation of these elements will be simplified or not provided. The system of the internal combustion engine 70 also includes constituent elements that are not shown in FIG. 15 but shown in FIG. 1.

As shown in FIG. 15, the internal combustion engine 70 of the third embodiment includes a burned gas injection valve 72 that injects burned gas (i.e., EGR gas) into each of the cylinders. The burned gas injection valve 72 may be installed in an end portion of the combustion chamber 14 closer to the intake valves 26, or may be installed in a central portion of the upper wall of the combustion chamber 14, like the fuel injection valve 62 of the second embodiment.

The internal combustion engine 70 includes a burned gas supply passage 74 through which high-pressure burned gas is supplied to the burned gas injection valve 72 of each cylinder. The burned gas supply passage 74 is connected to the exhaust passage 18 downstream of the exhaust clean-up catalyst 42. A compressor 76 that compresses burned gas so as to raise its pressure to such a level as to enable the gas to be injected into the cylinders during the compression stroke is installed-in the middle of the burned gas supply passage 74. The burned gas injection valves 72 and the compressor 76 are controlled by the ECU 50.

The control of the plug vicinity flow rate at the ignition timing according to the third embodiment will be described. FIG. 16 shows distribution of strong and weak portions produced in the tumble flow through minute injection of burned gas. In the third embodiment, the burned gas injection valve 72 is utilized for control of the plug vicinity flow rate at the ignition timing, as shown in FIG. 16, and minute injection of the burned gas is conducted so that the injected burned gas flows along the tumble flow. The manners of setting the fuel injection timing IT and the injection angle are similar to those as described above in the first embodiment and the second embodiment. Namely, FIG. 16 illustrates an arrangement in which the burned gas injection valve 72 is installed in an end portion of the combustion chamber 14 closer to the intake valves 26. In this case, the jet flow rotation angle $\Delta\theta$ is set to 180° (or 540° depending on the injection angle θ). In the case where the burned gas injection valve 72 is installed in a central portion of the upper wall of the combustion chamber 14, the jet flow rotation angle Δθ is set to 90° (or 450°), as in the second embodiment.

As in the case of the fuel in the first embodiment, etc., the amount of burned gas injected in the minute injection is increased as the engine speed is higher. Also, as in the first embodiment, etc., the injection pressure of burned gas may be increased as the engine speed is higher, instead of or in addition to increasing the amount of burned gas injected in the minute injection.

Figure 17:
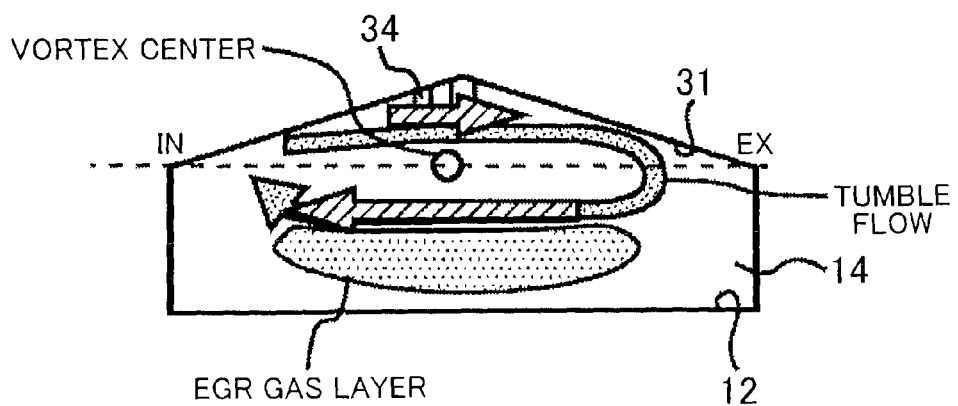
FIG. 17 is a view showing airflow distribution in the cylinder at the ignition timing when minute injection using burned gas is conducted.

FIG. 17 shows airflow distribution in the cylinder at the ignition timing when minute injection using burned gas is conducted. If the flow rate of a part of the tumble flow is increased due to the jet flow of burned gas through the minute injection, that part of the tumble flow turns into an EGR gas layer as shown in FIG. 16. As a result, as shown in FIG. 17, the vortex center of the tumble flow is shifted upward as in the first embodiment, etc., at the ignition timing, and the above-indicated part (namely, the EGR gas layer) is located in a region remote from the ignition plug 34 and close to the top face of the piston 12. Thus, so-called EGR stratified charge combustion is carried out. Therefore, through the minute injection using the burned gas, the vortex center of the tumble flow is shifted or changed so as to control the plug vicinity flow rate at the ignition timing, while assuring an improved thermal efficiency due to reduction of a cooling loss through the EGR stratified charge combustion.

A specific process according to the third embodiment will be described. The tumble flow rate control of the third embodiment executed by the ECU 50 is basically the same as the tumble flow rate control of the first embodiment and the second embodiment (namely, the process similar to the routine shown in FIG. 10), except that the burned gas is used in place of the fuel.

In the third embodiment as described above, the burned gas is used, in place of the fuel, for the minute injection. However, the gas flow rate control according to the invention may be performed by conducting minute injection using new air, instead of the burned gas.

In the first through third embodiments as described above, the gas flow rate control as a feature of the invention is applied to the engine that is in lean burn operation in which the ignition performance is likely to be influenced by the plug vicinity flow rate at the ignition timing. However, the gas flow rate control of the invention is not necessarily applied to the engine in the middle of lean burn operation, but may be applied to an internal combustion engine that is operated at the stoichiometric air/fuel ratio, for example.

What is claimed is:

1. A control system for a spark-ignition internal combustion engine, the spark-ignition internal combustion engine configured to produce tumble flow in a cylinder, and the spark-ignition internal combustion engine including an ignition plug configured to ignite an air-fuel mixture in the cylinder, the control system comprising:
a tumble flow rate controller configured to change a position of a vortex center of the tumble flow in a direction of a center axis of the cylinder, so as to control a flow rate of the tumble flow around the ignition plug at the ignition timing of the ignition plug, wherein
the tumble flow rate controller is configured to increase the flow rate of a part of the tumble flow at a first point in time, the first point in time being determined such that said part of the tumble flow reaches a position opposite to the ignition plug with respect to the vortex center of the tumble flow, when the ignition timing comes after the flow rate of said part of the tumble flow is increased.

2. The control system according to claim 1, wherein:
the internal combustion engine includes a fuel injection valve configured to inject a fuel into the cylinder such that the injected fuel flows along the tumble flow; and
the tumble flow rate controller is configured to cause the fuel injection valve to inject the fuel during an intake stroke or a compression stroke, so as to increase the flow rate of said part of the tumble flow by using jet flow of the fuel injected from the fuel injection valve.

3. The control system according to claim 2, wherein
the tumble flow rate controller is configured to increase an amount of the jet flow of the fuel injected from the fuel injection valve, such that the position of the vortex center of the tumble flow as viewed in the direction of the center axis of the cylinder at the ignition timing is shifted closer to the ignition plug.

4. The control system according to claim 2, wherein
the tumble flow rate controller is configured to raise a pressure of the fuel injected from the fuel injection valve, such that the position of the vortex center of the tumble flow as viewed in the direction of the center axis of the cylinder at the ignition timing is shifted closer to the ignition plug.

5. The control system according to claim 2, wherein
the tumble flow rate controller is configured to determine the time of execution of the fuel injection, based on the ignition timing, a tumble ratio, and a jet flow rotation angle required for said part of the tumble flow to reach the position opposite to the ignition plug at the ignition timing.

6. The control system according to claim 1, wherein:
the spark-ignition internal combustion engine includes a burned gas injection valve configured to inject burned gas into the cylinder such that the injected burned gas flows along the tumble flow; and
the tumble flow rate controller is configured to cause the burned gas injection valve to inject the burned gas during an intake stroke or a compression stroke, so as to increase the flow rate of said part of the tumble flow, by using jet flow of the burned gas injected from the burned gas injection valve.

7. The control system according to claim 6, wherein
the tumble flow rate controller is configured to increase an amount of the jet flow of the burned gas injected from the burned gas injection valve, such that the position of the vortex center of the tumble flow as viewed in the direction of the center axis of the cylinder at the ignition timing is shifted closer to the ignition plug.

8. The control system according to claim 6, wherein
the tumble flow rate controller is configured to raise a pressure of the burned gas injected from the burned gas injection valve, such that the position of the vortex center of the tumble flow as viewed in the direction of the center axis of the cylinder at the ignition timing is shifted closer to the ignition plug.

9. The control system according to claim 6, wherein
the tumble flow rate controller is configured to determine the time of execution of the burned gas injection, based on the ignition timing, a tumble ratio, and a jet flow rotation angle required for said part of the tumble flow to reach the position opposite to the ignition plug at the ignition timing.

\* \* \* \* \*